US 12,054,160 B2

(12) United States Patent
Harris et al.

(10) Patent No.: US 12,054,160 B2
(45) Date of Patent: Aug. 6, 2024

(54) RECONSTRUCTION AND ASSESSMENT OF PROFICIENCY IN AN INTEGRATED DEBRIEF BY A SERVER IN A NETWORK

(71) Applicant: 2 Circle, Inc., Woodbridge, VA (US)

(72) Inventors: David Harris, Smithfield, NC (US); Bradford Gilroy, Linthicum, MD (US)

(73) Assignee: 2 Circle, Incorporated, Woodbridge, VA (US)

( * ) Notice: Subject to any disclaimer, the term of this patent is extended or adjusted under 35 U.S.C. 154(b) by 389 days.

(21) Appl. No.: 17/427,709

(22) PCT Filed: Feb. 7, 2020

(86) PCT No.: PCT/US2020/017318
§ 371 (c)(1),
(2) Date: Aug. 2, 2021

(87) PCT Pub. No.: WO2020/163781
PCT Pub. Date: Aug. 13, 2020

(65) Prior Publication Data
US 2022/0111852 A1    Apr. 14, 2022

Related U.S. Application Data

(60) Provisional application No. 62/802,542, filed on Feb. 7, 2019.

(51) Int. Cl.
*B60W 40/09* (2012.01)
*B60W 40/02* (2006.01)
(Continued)

(52) U.S. Cl.
CPC ............ *B60W 40/09* (2013.01); *B60W 40/02* (2013.01); *G07C 5/0816* (2013.01);
(Continued)

(58) Field of Classification Search
CPC .. B60W 40/09; B60W 40/02; B60W 2555/20; G07C 5/0816; G07C 5/0841;
(Continued)

(56) References Cited

U.S. PATENT DOCUMENTS 6,959,265 B1 * 10/2005 Candela .............. G06F 11/3452
702/182
7,324,954 B2 * 1/2008 Calderaro .......... G06Q 10/0635
705/7.28

(Continued)

FOREIGN PATENT DOCUMENTS

| CN | 109636675 | 4/2019 |
| JP | 1185521 A | 3/1999 |

OTHER PUBLICATIONS

Cugola et al., "Low latency complex event processing on parallel hardware." In: Journal of Parallel and Distributed Computing. Feb. 2012 (Feb. 2012) Retrieved on Apr. 11, 2020 (Apr. 11, 2020) from <http://clteseerx.ist.psu.edu/vlewdoc/download?doi=10.1.1.914.6220&rep=rep1&type=pdf> entire document.

*Primary Examiner* — Mussa A Shaawat
(74) *Attorney, Agent, or Firm* — Haynsworth Sinkler Boyd, P.A.

(57) ABSTRACT

A non-transitory computer readable medium stores instructions that, when executed by a processor, cause the processor to utilize artificial intelligence to update a mission for an aircraft flown by a pilot. The instructions include: receiving, from at least one storage device, pre-event preparation information that identifies a mission for the aircraft and includes historical information about the pilot; receiving, from an operator device, event execution information that describes how the aircraft is being flown; comparing the pre-event preparation information to the event execution information and the historical information about the pilot using artificial intelligence to determine a deviation from the (Continued)

mission indicating that the mission will likely not be successful; and updating the mission based on the deviation.

24 Claims, 7 Drawing Sheets

(51) Int. Cl.
*G07C 5/08* (2006.01)
*G08G 5/00* (2006.01)

(52) U.S. Cl.
CPC .......... *G07C 5/0841* (2013.01); *G08G 5/0021* (2013.01); *B60W 2555/20* (2020.02)

(58) Field of Classification Search
CPC .......... G07C 5/08; G07C 5/12; G08G 5/0021; B60R 1/00; G06F 11/00
See application file for complete search history.

(56) References Cited

U.S. PATENT DOCUMENTS

| | | | |
|---|---|---|---|
| 7,366,680 B1* | 4/2008 | Creel | G06Q 10/063118 |
| | | | 705/7.17 |
| 8,156,481 B1* | 4/2012 | Koh | G06F 8/35 |
| | | | 717/154 |
| 8,204,861 B2* | 6/2012 | Sondhi | G06Q 40/00 |
| | | | 707/648 |
| 8,271,899 B1* | 9/2012 | Blackburn | G06F 3/046 |
| | | | 715/811 |
| 9,251,484 B2 | 2/2016 | Cantor et al. | |
| 9,405,531 B2 | 8/2016 | Vaidyanathan et al. | |
| 2002/0049625 A1 | 4/2002 | Kilambi et al. | |
| 2004/0030451 A1 | 2/2004 | Solomon | |
| 2005/0021384 A1* | 1/2005 | Pantaleo | G06Q 10/06 |
| | | | 705/7.22 |
| 2005/0165935 A1* | 7/2005 | Moody | G06F 11/323 |
| | | | 709/228 |
| 2005/0172018 A1* | 8/2005 | Devine | H04L 67/02 |
| | | | 707/E17.107 |
| 2005/0234758 A1* | 10/2005 | Nishi | G06Q 10/06 |
| | | | 705/80 |
| 2005/0235267 A1* | 10/2005 | McClard | G06F 11/3476 |
| | | | 717/127 |
| 2006/0053421 A1* | 3/2006 | Dickenson | G06F 11/3409 |
| | | | 714/E11.2 |
| 2006/0242001 A1* | 10/2006 | Heathfield | G06Q 10/10 |
| | | | 705/7.31 |
| 2007/0260505 A1* | 11/2007 | Richardson | G06Q 10/10 |
| | | | 705/7.23 |
| 2008/0154821 A1* | 6/2008 | Poulin | G06Q 10/0631 |
| | | | 706/21 |
| 2008/0313110 A1* | 12/2008 | Kreamer | G06Q 10/1097 |
| | | | 706/14 |
| 2010/0256961 A1 | 10/2010 | Bush | |
| 2011/0296057 A1* | 12/2011 | Shah | G06F 3/0488 |
| | | | 345/173 |
| 2012/0060142 A1* | 3/2012 | Fliess | G06F 11/3457 |
| | | | 717/102 |
| 2012/0117574 A1* | 5/2012 | Yu | G06F 11/3003 |
| | | | 719/316 |
| 2012/0323890 A1 | 12/2012 | Dixon et al. | |
| 2013/0018541 A1 | 1/2013 | Raz et al. | |
| 2013/0219057 A1* | 8/2013 | Li | G06F 8/70 |
| | | | 709/224 |
| 2014/0282010 A1 | 9/2014 | Young et al. | |
| 2015/0262484 A1 | 9/2015 | Victor et al. | |
| 2016/0161950 A1 | 6/2016 | Frangou | |
| 2017/0069147 A1 | 3/2017 | Palmer et al. | |
| 2017/0138744 A1 | 5/2017 | Jaquinta et al. | |
| 2018/0308018 A1 | 10/2018 | Bansal et al. | |
| 2019/0114574 A1 | 4/2019 | Greenawalt | |
| 2019/0171337 A1* | 6/2019 | Perrin | G06F 3/04845 |
| 2019/0340556 A1* | 11/2019 | Whitlow | G06F 3/167 |
| 2020/0151967 A1* | 5/2020 | Boggio | G07C 5/006 |
| 2020/0365036 A1* | 11/2020 | Canzonetta | G08G 5/0021 |
| 2020/0391884 A1* | 12/2020 | Hawley | B64F 5/60 |
| 2021/0026354 A1* | 1/2021 | Alves | G08G 5/0091 |
| 2022/0020280 A1* | 1/2022 | McCullen | G06N 3/084 |
| 2022/0111852 A1* | 4/2022 | Harris | B60W 40/02 |

* cited by examiner

701

| Operator | Event Outcome 1 | Event Outcome 2 | Skill 1 | Skill 2 | Skill 3 | Skill 4 | Skill 5 | Skill 6 |
|---|---|---|---|---|---|---|---|---|
| 1 | X | X | X | X | X | X | X | X |
| 2 | X | X | X | X | X | X | X | X |
| 3 | X | X | X | X | X | X | X | X |
| 4 | X | X | X | X | X | X | X | X |

RECONSTRUCTION AND ASSESSMENT OF PROFICIENCY IN AN INTEGRATED DEBRIEF BY A SERVER IN A NETWORK

REFERENCE TO RELATED APPLICATION

This application claims priority to U.S. Provisional Application No. 62/802,542 filed on Feb. 7, 2019, the entire contents of which application is incorporated herein by reference.

BACKGROUND

Computing and communication devices can perform an increasing variety of functions and tasks that continue to improve the user's experience. For example, computing and communication devices can run a variety of applications, can connect to a variety of wired and wireless networks and devices to obtain data and information and/or to receive services, can process data and/or perform data analytics using prescribed methods, can execute artificial intelligence operations on the data to modify current and/or future performance, and/or can download content, which can be stored and/or displayed by the computing and communicating devices.

In one example, computing and communication devices may collect information associated with an operation performed by an operator associated with a particular operation or event (e.g., a pilot flying an aircraft, a driver driving a vehicle, an athlete playing a game or match, a captain piloting a ship, an engineer operating a locomotive, a participant playing a game, etc.) and use such information to perform an assessment of the proficiency of an operator participating in the event.

Unfortunately, computing and communications devices may not always assemble and/or reconstruct the information associated with the operation or event in a manner that enables the details of "what" actually happened during the operation or event to be determined. Additionally, computing and communication devices may not analyze the reconstructed information in a manner that enables the details of "how" the operation was performed or how the event actually transpired to be determined. Computational and communication devices may not always assess the reconstructed and/or analyzed information in a manner that enables the details of "why" the operation or event was performed or occurred in a particular manner to be determined, which may preclude discovery of shortfalls in operator proficiency, may prevent the operator from gaining insight into such shortfalls to facilitate future proficiency improvements, and/or may prevent event planners, policy makers, or operators from identifying potential improvements in pre-event preparation (e.g., tactics development, operation plans, game plans, policies and procedures, etc.). To the contrary, for complex events and operations (e.g., those associated with flight operations, maritime operations, transportation and shipping operations, industrial operations, auto sports, sporting events, gaming events, etc., reconstructing events to determine the details of what actually transpired, analyzing information associated with the event to determine how the event transpired, and assessing the analyzed information to determine the details of why the event transpired in a particular manner to facilitate improvement is often done by the operator manually in a slow, tedious and laborious process due to the quantity of data involved and the multitude of disparate types, formats, data structures, collection methods, etc. of information obtained in connection with the events. Consequently, the ability to collect, fuse, parse, analyze, store, and report relevant training data across multiple domains of a complex event using existing data sources to facilitate consistent and effective reconstruction, analysis, and assessment of performance regardless of training environment does not exist in the art. Further, the ability to predict an operator's conduct and to provide real-time feedback to the operator based upon a comparison of the operator's current conduct to the training data does not exist in the art. Further still, the ability for artificial intelligence to "learn" the operator's behavior, to predict future outcomes based on the behavior and to recommend training or other other remedial measures is not known in the art.

While the description herein often describes the systems and/or methods in the context of a flight crew performing flight training operations and/or missions in a live aircraft or simulator for the sake of simplicity and clarity, the scope of the disclosure need not be so limited. In one or more other embodiments, the systems and/or methods, described herein, may be performed in connection with other operations and/or events associated with, for example, a driver driving an automobile (e.g., for driver training, auto sports, etc.), an engineer operating a locomotive or industrial equipment (e.g., at an industrial complex, power plant, airport, etc.), a pilot operating a marine vessel (e.g., for military operations, shipping, rescue, boat racing, etc.), an athlete engaged in a sporting event (e.g., basketball, soccer, football, etc.), etc. Further, the systems and/or methods, described herein, may be utilized in connection with simulators (e.g. aircraft simulators, vehicle simulators, sporting event simulators, etc.) in which operations and/or events are recreated for training purposes.

SUMMARY

In a first example embodiment, a method for optimizing the proficiency of an operator of a vehicle undertaking an event in the vehicle includes obtaining, by an application server, pre-event preparation information, the pre-event preparation information comprising a first detail that provides information about the event. The method further includes obtaining, by the application server, event execution information, the event execution information identifying a second detail that describes how the event is being undertaken by the operator. The method further includes analyzing, by the application server, the event execution information to generate reconstruction information, the reconstruction information including a timeline of one or more activities that occurred during the event, including the second detail. The method further includes comparing, by the application server, the reconstruction information to the pre-event preparation information to determine a deviation between the first detail and the second detail. The method further includes determining, by the application server, a level of proficiency of the operator based on the deviation, the level of proficiency identifying a strength or a weakness of the operator. The application server may execute a proficiency application to perform the method, the proficiency application utilizing artificial intelligence to generate the reconstruction information. The method may further include obtaining by the application server, or a second server device environment information that describes the environment in which the event occurred and comparing by the application server the environment information to the reconstruction information to determine whether the deviation was based, in whole or in part, on the environment. The method may further include updating the level of proficiency of the operator when the application server determines that the deviation was based, in whole or in part, on the environment. The method may further include obtaining by the application system characteristics that identify a characteristic of a vehicle used by the operator during the event and comparing by the application server the system characteristics to the reconstruction information to determine whether the deviation was based, in whole or in part, on the system characteristics. The method may further include updating the level of proficiency of the operator when the application server determines that the deviation was based, in whole or in part, on a characteristic of the vehicle. The method may further include identifying by the application server remedial measures for the operator, the remedial measures intended to increase the proficiency of the operator. The method may further include developing improvements that update the pre-event preparation information based on the level of proficiency or the reconstruction information, the improvements increasing the likelihood of success of a future event. The method may further include creating by the application server a debrief report that includes the reconstruction information and the level of proficiency of the operator. The pre-event preparation information may be obtained by the application before the event occurs, during the event or after the event.

In a second example embodiment, an artificial intelligence system for providing real-time instructions to an operator of a vehicle, or for controlling the vehicle, while the operating is executing an event with the vehicle includes an application server in communication with an operator device, associated with the vehicle, the application server executing instructions provide real time instructions to the operator while executing the event. The artificial intelligence system includes at least one storage device that includes system characteristics, the system characteristics identifying a characteristic of the vehicle, and pre-event preparation information, the pre-event preparation information identifying a detail of the event. The application server executes instructions to receive, from the at least one storage device or the operator device, pre-event planning information that describes how the event should occur. The application server further executes instructions to receive, from the operator device, event execution information that describes how the event is actually occurring. The application server further executes instructions to compare the pre-event planning information to the event execution information using artificial intelligence to determine that the event is not being executed to match the pre-event planning information. The artificial intelligence includes data modeling or regression techniques to predict the anticipated future conduct of the operator. The application server further includes executing instructions to communicate with either the operator to provide an instruction to change how the vehicle is operated or with the operator device to provide an instruction that is executed by the vehicle that overrides the operator's controls to determine how the vehicle is controlled or that autonomously controls the vehicle, the instruction based on the anticipated future conduct of the operator. The vehicle may corresponds to an aircraft, and the event execution information may be obtained from at least one of a time-position-space system, a mission card, a cockpit recorder system or a maintenance card. The instruction may be provided to the operator visually via a display device of the vehicle, auditory via a speaker of the vehicle, or mechanically by a vibration device that imparts a vibration to the operator. The instruction may be provided to the operator device to overrides an operator control input or provides autonomous control input. The operator control input may be a steering wheel, a control stick, a foot pedal, a button, brakes, flaps, or a rudder. The application server may execute instructions to receive, from the at least one storage device or the operator device, environment information that describes the environment in which the event is occurring and include the environment information in the comparison of the pre-event planning information and the event execution information to determine that the event is not being executed to match the pre-event planning information. The application server may further executes instructions to receive, from the at least one storage device or the operator device, system characteristics that identify a characteristic of the vehicle and may include the system characteristics in the comparison of the pre-event planning information and the event execution information to determine that the event will is not being executed to match the pre-event planning information. The storage device may be integrated into a server device.

In a third example embodiment, a non-transitory computer readable medium storing instructions that, when executed by a processor, causes the processor to utilize artificial intelligence to update a mission for an aircraft flown by a pilot is provided. The instructions include receiving, from at least one storage device, pre-event preparation information that identifies a mission for the aircraft and includes historical information about the pilot. The instructions further include receiving, from an operator device, event execution information that describes how the aircraft is being flown. The instructions further include comparing the pre-event preparation information to the event execution information and the historical information about the pilot using artificial intelligence to determine a deviation from the mission. The artificial intelligence performs artificial intelligence techniques using the historical information about the pilot to determine that the mission will likely not be successful. The instructions further include updating the mission for the aircraft based on the deviation to increase the likelihood that the mission will be successful, that the pilot will not be harmed or that the risk of financial loss will be minimized. The instructions may further include receiving, from the at least on storage device, system characteristics that identify a characteristic of the aircraft and including the system characteristics in the comparison of the pre-event preparation information to the event execution information and the historical information about the pilot to determine the deviation from the mission. Updating the mission may include providing a notification to the pilot that instructs the pilot to return to base. The artificial intelligence may include analyzing the historical data about the pilot using regression techniques, or other data analysis techniques, to determine the anticipated future conduct of the pilot and comparing the anticipated future conduct of the pilot to the mission to determine that the mission will likely not be successful. The mission may include flight path information, and the event execution information may include time, space, position and heading information for the aircraft. The storage device may be integrated into a server device.

DETAILED DESCRIPTION

Figure 1:
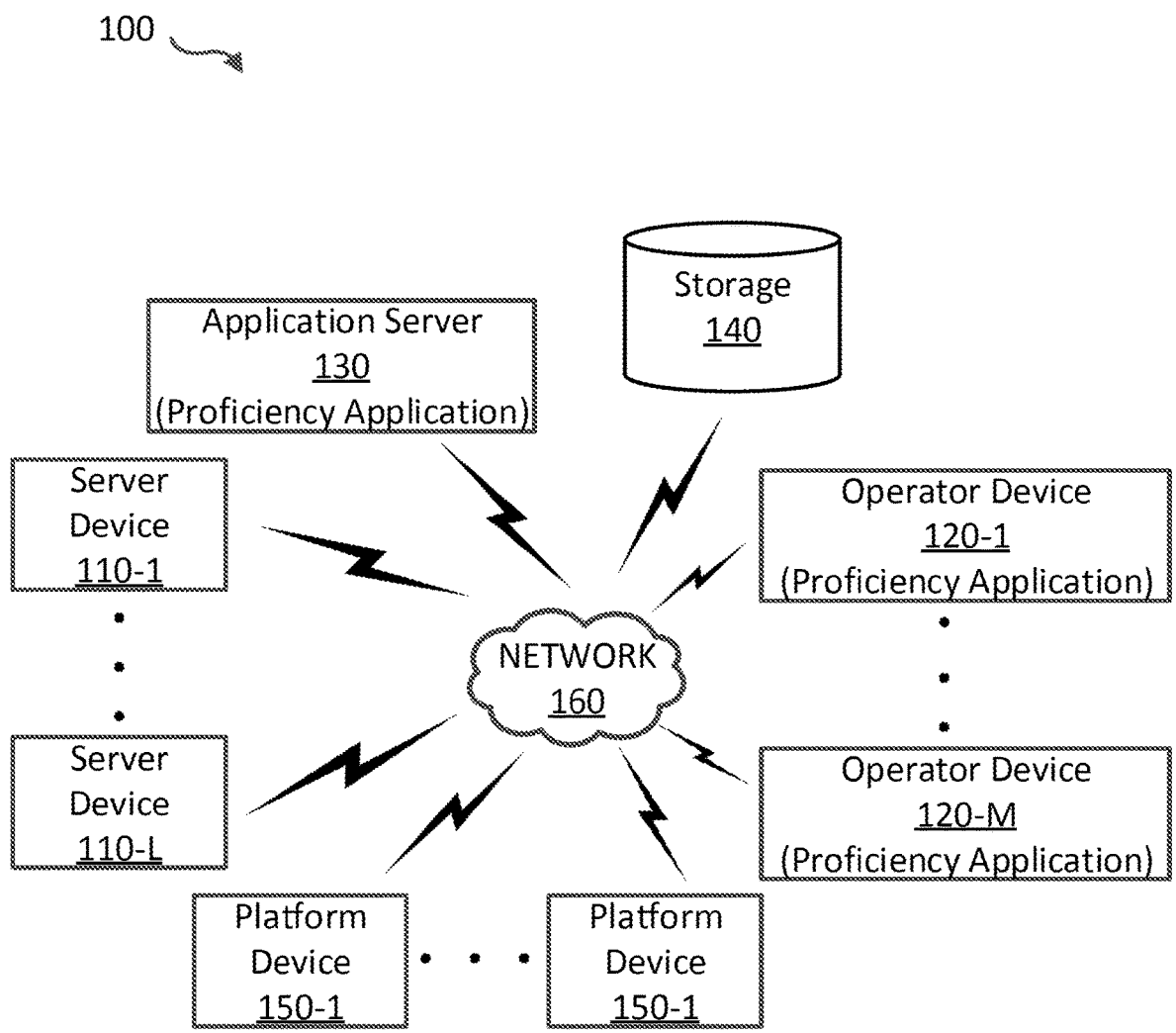
FIG. 1 is a diagram of an example environment in which systems and/or methods described herein may be implemented.

The following detailed description refers to the accompanying drawings. The same reference numbers in different drawings may identify the same or similar elements.

As will be described in greater detail below, the systems and/or methods, described herein, may include a server device and/or operator device on which a proficiency application is installed and/or executed to perform one or more operations as described herein. The systems and/or methods may enable the server device, executing the proficiency application, to obtain information associated with preparing for an operation and/or event including but not limited to information that identifies the type of event (e.g., a flight event, a locomotive event, a marine navigation event, an industrial process, a combat event, a training or test event, a sporting event, a gaming event, an automobile event, etc.) or operation (e.g., operating a live or simulated aircraft, locomotive, marine vessel, automobile and/or industrial machine, and/or performing a role in a sporting event, game, competition, etc.) (hereinafter, collectively referred to as "Pre-Event Preparation Information"). The Pre-Event Preparation Information may also, or alternatively, include information associated with preparing for an event or operation including information associated with a pre-determined policy, a mission, procedures, training syllabi, a game plan, a shipping manifest, tactics, rules of engagement, a rule book, a play book, etc. that govern the manner in which the operation and/or event are to be executed. The Pre-Event Preparation Information may also, or alternatively, include historical information about an operator (e.g. a pilot, a driver, a captain, etc.). The historical information about the operator may identify how the operator has operated (i.e. responded to events, controlled a vehicle, etc.) during previous events.

The systems and/or methods may also, or alternatively, enable the server device, executing the proficiency application, to obtain information associated with a vehicle, platform, system, simulator and/or subsystem. Hereinafter, unless otherwise indicated, singular references to "vehicle" or "platform" or "system" or "simulator" shall be interpreted broadly to include some or all of a "vehicle," "platform," "system," "simulator" and/or "subsystem") to be used in connection with the operation and/or event (hereinafter, collectively referred to as "System Characteristics"). System Characteristics may include information that identifies the type of system used by the operator or other operators (e.g., model, type and/or series of an aircraft, rotorcraft, marine vessel, automobile, weapon system, threat system, computer system, industrial machine, etc.), performance characteristics (e.g., minimum, maximum, average, optimum, etc.) of the system (e.g., speed, acceleration, altitude, climb rate, range, engine performance, radar performance, bandwidth, data rate, waveform, signal strength, fuel consumption, horsepower, thrust, torque, temperature, pressure, deceleration, turn-rate, down force, etc.), etc. In the context of a sporting event, System Characteristics may also, or alternatively, identify an operator's personal performance characteristics (e.g., speed, strength, vertical jump, shooting percentage, scoring average, batting average, quantity of disqualifications, quantity of infractions, etc.) determined prior to the event or operation.

The systems and/or methods may enable the server device, executing a proficiency application, to obtain information associated with the environment in which the event and/or operation occurred (hereinafter, referred to as "Environment Information") including, for example, weather or climate conditions (e.g., temperature, humidity, due point, wind speed and direction, precipitation, etc.), environmental conditions (e.g., visibility, sea state, road or track conditions, traffic conditions, terrain, field conditions, available spectrum, etc.), and other environmental factors such as track layout, airspace, field type, etc.

The systems and/or methods may enable the server device, executing the proficiency application, to obtain information associated with an operator when performing the operation and/or during the event (hereinafter, referred to as "Event Execution Information" including, for example, operator decisions made and/or actions taken (e.g., timing of such actions and/or decisions, vehicle speed, acceleration/deceleration, flight path, direction, altitude, turn rate, vehicle input commands (such as throttle, stick, rudder, flap, aileron, steering wheel, braking, etc. position, movement and/or pressure), employment of onboard systems, communications with other participants, navigation decisions, weapon selection and deployment, shot selection, points scored, assists made, turnovers, errors made, etc.). The Event Execution Information may describe how an operation is occurring (i.e. how an aircraft is being flown, weapons deployed, how a ship is directed, etc.).

Additionally, or alternatively, the systems and/or methods may enable the server device, executing a proficiency application, to process the Environment Information and/or the Event Execution Information obtained in connection with the operation and/or event to generate reconstruction information that enables the details of "what" occurred during the operation and/or event to be determined (hereinafter, collectively referred to as "Reconstruction Information").

Additionally, or alternatively, the systems and/or methods may enable the server device, executing a proficiency application, to analyze the Reconstruction Information in the context of the Pre-Event Preparation Information, and/or System Characteristics to generate operations analysis information that identifies the details of "how" the operation and/or event was performed (hereinafter, collectively referred to as "Operations Analysis Information"). The Operations Analysis Information may, for example, include information that identifies the manner in which the actual operation conformed to the planned operation and/or the manner or degree to which the actual operation deviated from the planned operation.

Additionally, or alternatively, the server device, executing a proficiency application, may perform an assessment of the Operations Analysis Information to determine one or more causes of "why" the performance of an actual operation deviated from a how the operation was planned to be performed. For example, the server device may identify one or more prescribed metrics and/or assessment points associated with the operation based on the Pre-Event Preparation Information. The one or more metrics and/or assessment points may be used to evaluate the proficiency in which an operator executed an operation based on whether the operator adhered to one or more tactics, training syllabi, plans, policies, procedures, etc. associated with the operation.

The systems and/or methods may enable the server device to assess the Operations Analysis Information to create Proficiency Information. The Proficiency Information may, for example, identify the one or more metrics and/or assessment points and may identify each instance in which an activity or task, performed by the operator during an actual operation, deviated from a prescribed metric based on the pre-planned tactics, mission plans, rules of engagement, policies, procedures, training curricula, etc. The server device may identify the quantity of deviations, a level of severity of each deviation, and/or a level of criticality of each deviation (e.g., due to the risk of injury, loss of life, or substantial loss of property, etc.) and may determine a level of proficiency and/or a proficiency score for the operator when performing the operation.

The systems and/or methods may include a server device, executing a proficiency application, that uses artificial intelligence and machine learning logic, associated with an operation, to modify the Pre-Event Preparation Information, to determine the Reconstruction Information, to predict the future conduct of an operator and/or to perform the proficiency assessment of an operator during a current operation or a future operation. For example, the server device may determine that the respective outcomes of one or more operations are not affected even when a particular metric, associated with the operation, varies widely (e.g., greater than a threshold). Based on such a determination, the server device may determine that a mission plan, tactic, training curriculum, policy, procedure etc., associated with the Pre-Event Preparation Information, should be modified to decrease the importance or emphasis that is placed on such a metric. The server device may also, or alternatively, determine that respective outcomes of one or more operations are significantly and/or unexpectedly affected even when a different metric, associated with the operation, varies only slightly and may determine that a mission plan, tactic, training curriculum, policy, procedure etc. should be modified to decrease the importance or emphasis that is placed on such a metric.

The artificial intelligence, or machine learning, used in connection with the systems and/or methods may be an artificial intelligence system that includes techniques used in computer technology to make predictions, to emulate human capabilities and/or to replace human capabilities. References to artificial intelligence or machine learning herein are references to this artificial intelligence system. Artificial intelligence includes multiple methods of data modeling and/or analysis (regression, multiple classification, binary classification, predictive decision support, clustering, anomaly detection, decision trees, support vector machines, Bayesian networks, and genetic algorithms). Of these techniques, regression methods may be used when the explanatory and output variables are reasonably well understood and a continuous-variable output is desired for explanatory or predictive purposes, which is the case with the training data that we analyze. Regression analysis may be used to extract a particular result or recommendation (i.e. to predict future conduct based on previous conduct, to approximate what occurred when data is not present, etc.), which may be used to improve operator performance, before or after an event. The information (i.e. data from a server or device described herein, such as Pre-Event Preparation Information, System Characteristics, Environment Information, Event Execution Data, Reconstruction Information, etc.) described herein may be used to define a dependent variable based on two or more explanatory variables. In this way, a regression model is then formulated, employing the selected parameters and based on sample data derived from the servers, etc., to make decisions based on the estimations and/or predictions that result therefrom. From this artificial intelligence analysis, the following examples of may be determined: relationships between an operator's skills (i.e. what particular skills affect the event) and the likelihood of success of an event; how additional training will affect an operator's performance based on previous increases due to the same/similar training and/or the pilot's improvement due to previous training; the accuracy of a prediction; how changes in performance affect outcomes; determine performance optimization (i.e. point of diminishing returns of training, etc.); forecasts of future outcomes of Pre-Event Planning Information based on existing information and how changing known variables (i.e. training, etc.) affects future outcomes; etc. Artificial analysis may be used build data models that enable the foregoing analysis and may be used to predict the outcomes described herein.

The systems and/or methods may enable the server device, executing a proficiency application, to monitor the Event Execution Information and/or the Environment Information to determine, in real time, the proficiency of an operator and/or the likelihood of success of an event or operation. Determining the proficiency of an operator and/or the likelihood of success of an event or operation may include executing the proficiency application to compare the Event Execution Information and/or the Environment Information to (a) the Pre-Event Preparation Information; and/or (b) Event Execution Information, Reconstruction Information, Operations Analysis Information, etc. from other events or operations. Based upon the comparison, the systems and/or methods may create a notification and/or instruction associated with a system being operated by an operator during an event or operation. The notification and/or instruction may be transmitted by the server device to the platform device to notify the operator when the operator deviates from a prescribed policy, plan, tactic, procedure or the like when performing the operation. Additionally, or alternatively, the notification and/or instruction may notify the operator of the need to deviate from the prescribed policy, plan, tactic, procedure, or the like when performing the operation. Such notification and/or instruction may be used by the platform to override the operator and automatically take corrective action to minimize or eliminate the deviation or to autonomously control the platform (i.e. absent operator input or in an autonomous platform).

The systems and/or methods may enable the server device, executing the proficiency application, to create an integrated debrief and/or memorialize an operation. The server device may store some or all of the information collected and/or generated prior to the event, during execution of the event, and/or after the conclusion of the event. The server device may also, or alternatively, generate a report that includes some or all of the information associated with the operation and/or event and may transmit the report to one or more other server devices to inform a relevant governing agency and/or organization of the results and/or outcomes of the operation. The server device may also, or alternatively, present the information, associated with the operation and/or event, for display via a user interface as a training aid to the operator in a manner described herein.

FIG. 1 is a diagram of an example environment 100 in which systems and/or methods described herein may be implemented. As shown in FIG. 1, environment 100 may include a group of server devices 110-1, ..., 110-L (where L≥1) (hereafter referred to collectively as "servers 110" and each, a "server 110"), a group of operator devices 120-1, ..., 120-M (where M≥1) (hereinafter referred to collectively as "operator devices 120" and individually as "user 120"), an application server 130, a storage device 140, a group of platform devices 150-1, ..., 150-N (where N≥1) (hereinafter referred to collectively as "platform devices 150" and individually as "platform device 150"), and a network 160. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Server device 110 may include one or more server devices, or other types of computation or communication devices, that gather, process, search, store, and/or provide information in a manner described herein. Server device 110 may represent a website that can be accessed by application server 130 and/or operator device 120 via network 160. Server device 110 may provide a service that provides access to Pre-Event Preparation Information, System Characteristics and/or Environment Information that could be used to prepare for and/or conduct and operation and/or event. Server device 110 may also, or alternatively, include any type or form of content provider. For example, server device 110 may include video broadcast providers, Internet-based content providers, on-demand, etc. that stream content via network 160 and/or permit content to be downloaded (e.g., via progressive download, etc.). A media stream, as used herein, may include a stream of content such as video content (e.g., a video stream), audio content (e.g., an audio stream), textual content (e.g., a textual stream) or data content (e.g., a data stream).

Server device 110 may be associated with Pre-Event Preparation Information, as described above, that may be used to prepare for an event or operation. In one example, server device 110 may be associated with a public or private agency or governing body from which information associated with a policy that governs the manner in which an operation and/or event is to be performed and may be obtained based on communications received from network 160. The information associated with the policy may be associated with laws, regulations, policies, and/or standards applicable to a type of operation and/or event, such as, for example, civilian air operations (e.g., Federal Aviation Administration (FAA) policies and regulations), locomotive operations (e.g., Federal Railroad Administration (FRA) policies and regulations), automotive operations (e.g., National Highway Traffic Safety Administration (NHTSA)), maritime operations (e.g., U.S. Maritime Administration and/or U.S. Coast Guard policies and regulations), sporting events (e.g., various state and local laws and regulations and/or other governing bodies), etc. In one example, the information associated with the policy for military operations may include information associated with a National Security Strategy, National Military Strategy, National Defense Strategy, mission essential tasks (METs), measures of effectiveness (MOEs), measures of performance (MOPs), etc. In another example, server 110 may be associated with an organization from which training syllabi may be obtained to be used for an operation or event. In yet another example, server device 110 may be associated with an organization from which tactics to be used in the operation and/or event can be obtained. In still another example, server device 110 may be associated with an organization from which a rule book, procedures, etc. associated with an operation or event can be obtained. Server device 110 may store (in storage device 140 and/or a memory associated with server device 110) and/or enable information associated with previous or existing operations and/or events to be obtained directly and/or from application server 130, operator device 120, and/or platform server 150. Such information may include Pre-Event Preparation Information, System Characteristics, and/or Environment Information. Such information may also, or alternatively include post-event processing information including Reconstruction Information, Operations Analysis Information, Proficiency Information, or information for modifying and/or improving Pre-Event Preparation Information, etc. associated with previous and/or current operations and/or event. Server device 110 may provide the information described herein to, for example, application server 130 and/or may obtain the information from storage 140 (which may be part of server device 110). Further, it is known that when information is provided from server device 110 to another device, such as application server 130, the information may also be provided by any of the other devices and/or storage 140.

Operator device 120 may include any computation or communication device, such as a wireless mobile communication device that is capable of communicating with a network (e.g., network 160). For example, operator device 120 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device that is capable of sending traffic to and/or receiving traffic from the network 160. Additionally, or alternatively, operator device 120 may include a desktop computer, a landline telephone, a set top box, and/or other communication or communication device that is capable of communicating with network 160. In one example implementation, operator device 120 may include a global positioning satellite (GPS) component that communicates with a GPS constellation to obtain information associated with a location of operator device 120 (hereinafter referred to as "location information").

Operator device 120 may communicate with application server 130 and/or storage device 140, via network 160, to obtain a proficiency application and/or register the proficiency application and/or operator device 120 with application server 130. Operator device 120 may communicate with application server 130, server device 110 and/or storage device 140 to obtain Pre-Event Preparation Information, System Characteristics, Event Execution Information, Environment Information, Reconstruction Information, Operations Analysis Information, Proficiency Information, etc. associated with a previous operation and/or event. Application server 130 may use some or all of such information to perform one or more operator proficiency assessment operations described herein and as described in greater detail below with respect to FIG. 3.

Operator device 120 may include a mission planning application, a flight planning application, a game planning application and/or some other planning application that is used by an operator, of a platform, to enable the operator to plan the operation and/or event. Such information may be used to augment and/or become part of the Pre-Event Planning Information, System Characteristics, (e.g., identify a flight schedule, identify airspace constraints, update an aircrew logbook, identify other platforms or operators participating, identify aircraft configuration and/or subsystems, identify an instructor, identify platform maintenance status or issues, identify mission type, identify tactics, procedures and/or rules of engagement to be employed during the operation, etc.). Operator device 120 may provide the planning information to application server 130 and/or server device 110 to incorporate with Pre-Event Planning Information associated with the operation and/or event to be executed.

Application server 130 may include one or more server devices, or other types of computation or communication devices, that gather, process, search, store, and/or provide information in a manner described herein. Additionally, or alternatively, application server 130 may include one or more server devices, or other types of computation or communication devices, that plan, understand, recognize, learn and/or problem solve in the matter described herein (e.g. machine learning, artificial intelligence, etc.). Application server 130 may communicate with storage device 140, via network 160, to obtain a proficiency application and may communicate with operator device 120 (e.g., via network 160) to provide a copy of the proficiency application and/or to register operator device 120. Application server 130 may execute the proficiency application and may use the proficiency application to communicate with server device 110 to obtain pre-event planning information associated with an operation and/or event. Application server 130 may communicate with server device 110, storage device 140, operator device 120 and/or platform device 150 to obtain Pre-Event Preparation Information, System Characteristics, Event Execution Information, Environment Information, Reconstruction Information, Operations Analysis Information, Proficiency Information, etc. associated with a previous operation and/or event. Application server 130 may use some or all of such information to perform one or more operator proficiency assessment operations described herein and as described in greater detail below with respect to FIG. 3. Additionally, or alternatively, application server 130 may monitor the Event Execution Information and/or the Environment Information to determine, in real time, the proficiency of an operator and/or the likelihood of success of an event or operation. Determining the proficiency of an operator and/or the likelihood of success of an event or operation may include executing the proficiency application to compare the information described herein.

Storage 140 may include one or more devices that store information and/or data (i.e. a non-transitory computer medium, etc.) received from application server 130 and/or operator device 120. Storage 140 may store proficiency applications and/or information associated with an event including Pre-Event Preparation Information, System Characteristics, Environment Information, Event Execution Information, Reconstruction Information, Operation Analysis Information, Proficiency Information and information used to modify Pre-Event Preparation Information developed via artificial intelligence and/or machine learning routines.

Platform device 150 may include one or more server devices, or other types of computation or communication devices, that gather, process, search, store, and/or provide information in a manner described herein. In some examples, platform device 150 may be operator device 120, and references to platform device herein should be construed to include platform device 150 and/or operator device 120. Platform device 150 may include one or more server devices, or other types of computation or communication devices, that plan, understand, recognize, learn and/or problem solve in the matter described herein. Platform device 150 may be associated with a platform, vehicle, system, simulator and/or subsystem (e.g., a manned or unmanned aircraft, a weapon system, a locomotive, a marine vessel, an automobile, a simulator of the foregoing, etc.) being operated by an operator. Platform device 150 may correspond to a data collector that records Event Execution Data as a function of time during and/or after the conclusion of an operation and/or event. Platform 150 may transmit such recorded information to application server 130 via network 160. In a non-limiting example, platform device 150 may correspond to a maintenance recorder, a mission recorder, a system computer, or the like that monitors and/or records system data (e.g., time, space, position, speed, acceleration/decelerations, maneuvers, subsystems employed, maintenance issues encountered, operator control inputs, voice and/or audio recordings, video recordings, etc.). In one example, platform device 150 may be a portable device that is removable from the platform or simulator during or at the conclusion of the operation and/or event to permit the transfer of recorded information to application server 130 and/or operator device 120 via wired and/or wireless transmission, and/or via network 160. Platform device 150 may be physically located on (e.g. permanently installed, detachably mounted, carried on by the operator, etc.) the vehicle, platform, system, simulator or subsystem with which platform device 150 is associated. Additionally, or alternatively, platform device 150 may be located separate from the associated vehicle, platform, system, simulator or subsystem but may communicate, such as via network 160, with the vehicle, platform, system, simulator or subsystem (e.g. communicate with an associated operator device 120, subsystem, control panel, user interface, etc.) to execute the systems and/or methods described herein.

Platform device 150 (or operator device 120) may also, or alternatively, receive a notification, or instruction, from operator device 120 and/or application server 130 that includes information that can be used, by platform 150, to instruct the operator during an operation or event. The notification or instruction may, for example, include information that identifies a policy, tactic, flight path, or other action to be followed by the operator while executing an operation. Platform device 150 may receive the notification or instruction and present a corresponding instruction for display on a display device associated with the platform (e.g., a cockpit display, a dashboard display, etc.) and/or may output the instruction to the operator via an audio speaker to inform the operator of the instruction. In a another example, platform device 150 may cause a vibration or some other signal to be imparted on the operator (e.g., via an actuator or other vibration-inducing device associated with a seat on which the operator is seated, a control stick or steering wheel being held by the operator, etc.) in the event the operator begins to cause the platform to deviate from a planned operation.

Platform device 150 (or operator device) may receive the notification/instruction and may augment control of a platform and/or simulator to avoid or minimize a deviation by an operator piloting such platform or simulator. In one example, platform device 150 may override operator control inputs (e.g., via a steering wheel, control stick, foot peddle, button, etc.) and output second control inputs to cause a simulator or platform to change orientation, direction, speed, etc. in order to avoid deviating from prescribed tactics, training syllabi, flight plan, etc. Alternatively, platform device 150 or operator device may provide autonomous controls. In yet a different example, platform device 150 may cause an actuator, associated with the control stick, steering wheel, brakes, flaps, rudder or other platform control device, to control the path, speed, direction, elevation, turn rate, etc. of the platform to avoid deviating from a prescribed planned path, speed, direction, elevation, turn rate, etc. as set forth in a flight plan obtained from Pre-Event Preparation Information associated with the operation. In yet a different example, platform device 150 may cause the platform control device to perform a function that causes the platform to deviate from the prescribed planned path, speed, direction, elevation, turn rate, etc., as previously set forth in Pre-Event Preparation Information based upon real-time Environmental Information, Event Execution Information, etc.

Network 160 may include one or more wired and/or wireless networks. For example, network 160 may include a cellular network, a public land mobile network (PLMN), a second generation (2G) network, a 3G network, a 4G network, a fifth generation (5G) network, and/or another network. Additionally, or alternatively, network 160 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks including one or more classified government networks.

Figure 2:
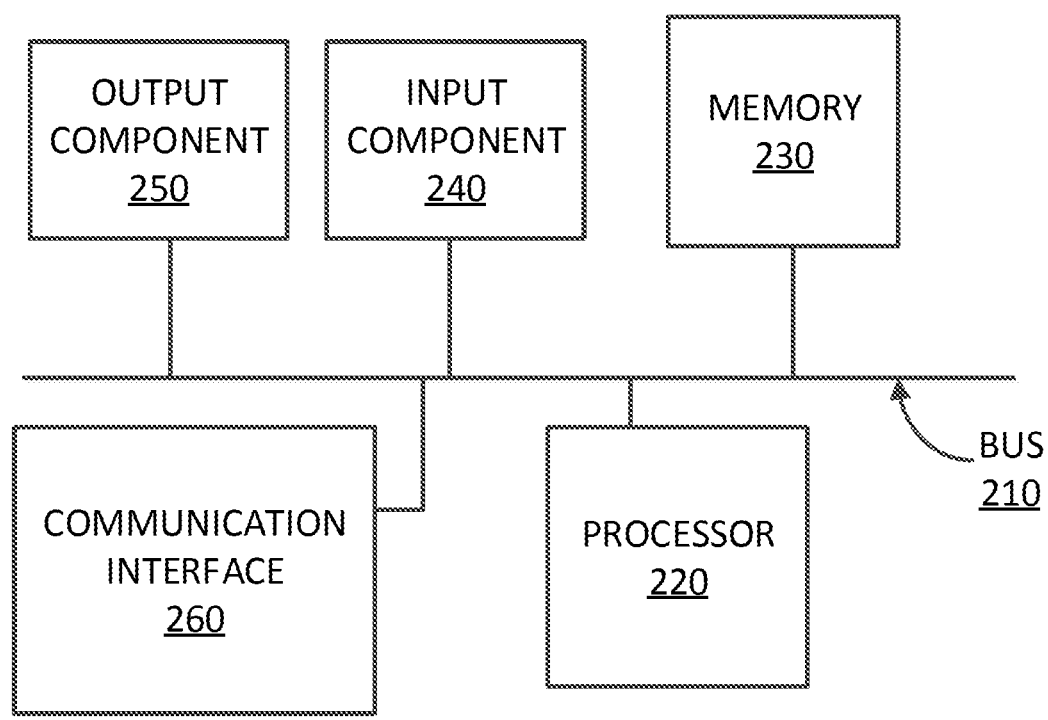
FIG. 2 is a diagram of example components of one or more of the devices of FIG. 1.

FIG. 2 is a diagram of example components of a device 200 that may correspond server device 110, operator device 120, application server 130, and/or platform device 150. Alternatively, or additionally, each of server 110, operator device 120, application server 130, and/or platform device 150 may include one or more devices 200 and/or one or more components of device 200. Device 200 may include a bus 210, a processor 220, a memory 230, an input component 240, an output component 250, and a communication interface 260. Although FIG. 2 shows example components of device 200, in other implementations, device 200 may include fewer components, additional components, different components, or differently arranged components than depicted in FIG. 2. Additionally, or alternatively, in other implementations, one or more components of device 200 may perform one or more tasks described as being performed by one or more other components of device 200.

Bus 210 may include a path that permits communication among the components of device 200. Processor 220 may include a processor, microprocessor, or processing logic that may interpret instructions, execute instructions, and adjust instructions based upon the data processed by processor 220. Memory 230 may be a storage device that includes any type of dynamic storage device that may store information and instructions for execution by processor 220, and/or any type of non-volatile storage device that may store information for use by processor 220. As used in this application, storage device may refer to memory 230, which is integrated into another device (e.g. server device 110, operator device 120, platform device, etc.), or a device that is primarily used for storage device, such as storage 140.

Input component 240 may include a mechanism that permits an operator to input information to device 200, such as a keyboard, a keypad, a button, a switch, etc. Output component 250 may include a mechanism that outputs information to the operator, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 260 may include mechanisms for communicating with another device or system via a network, such as network 140.

As will be described in detail below, device 200 may perform operations relating to performing an operator proficiency assessment. Device 200 may perform these operations in response to processor 220 executing software instructions contained in a computer-readable medium, such as memory 230. A computer-readable medium may be defined as a non-transitory memory device. A memory device may be a storage device that may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
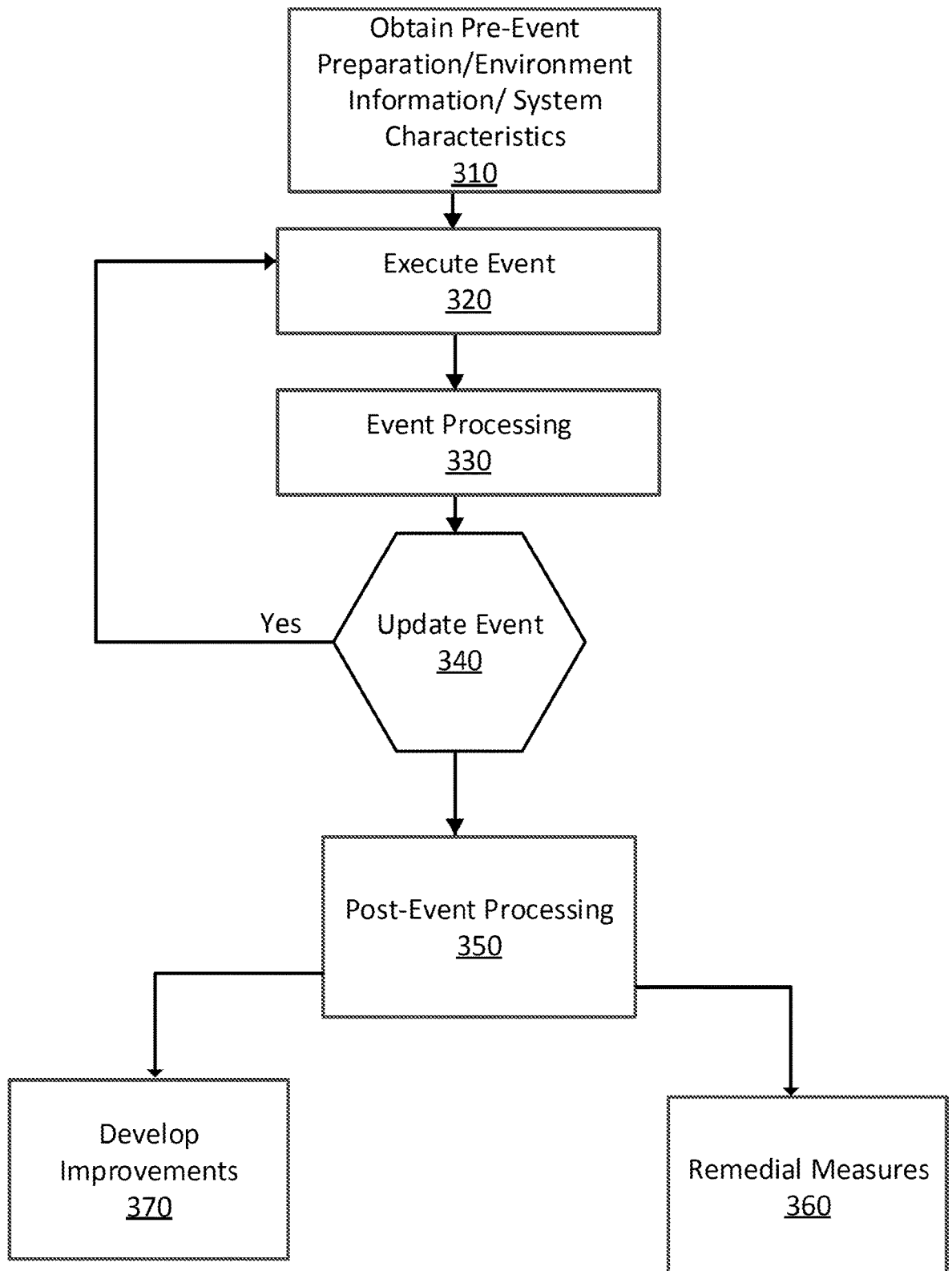
FIG. 3 is a diagram of a process for performing an operator proficiency assessment operation.

FIG. 3 is a diagram of an example process 300 for performing an operator proficiency assessment. In one example implementation, process 300 may be performed by application server 130 executing a proficiency application previously obtained and installed on application server 130. In another example implementation, some or all of process 300 may be performed by a device (such as device 200) or a collection of devices, such as operator device 120, separate from, or in combination with, application server 130.

As shown in FIG. 3, process 300 may include obtaining Pre-Event Preparation Information 310 from one or more server devices 110. In one example, application server 130 may communicate with a first server device 110 to obtain information associated with a prescribed policy (e.g., a national security policy, a national defense strategy, one or more mission essential tasks (METs), measures of effectiveness (MOEs), measures of performance (MOPs), etc.) that governs an operator and/or event to be performed by an operator of a system. Application server 130 may also, or alternatively, communicate with a second server device 110 to obtain Pre-Event Preparation Information 310 to be used to plan the operation and/or event including, for example, information associated with tactics to be employed, procedures to be followed to perform the operation, training syllabi and/or objectives, a flight plan, a float plan, a mission plan, a game plan, shipping manifest, tactics to be employed, rules of engagement, a rule book, a play book, etc. associated with the operation and/or event. Application server 130 may communicate with a third server device 110 to obtain other Pre-Event Preparation Information such as, for example, information that identifies the type of event (e.g., an event associated with flight training, a locomotive training, marine navigation training, an industrial process, a combat training event, a sporting event, a gaming event, an automobile training event, etc.) or operation (e.g., operating a live or simulated aircraft, locomotive, marine vessel, automobile and/or industrial machine, and/or performing a role in a sporting event, game, competition, etc.), an operator participating in the event (e.g., a name, personal identification number, a certification level, an authorization, a rank, a seniority or experience level, a role or position, etc.), information associated with one or more other operators in the event (e.g., information identifying one or more teammates, co-pilots, instructors, competitors, threat operators, etc.), etc. Application server 130 may also, or alternatively, communicate with one or more operator devices 120 to obtain Pre-event Preparation Information 310 developed by one or more operators associated with operator devices 120 and participating in the operation and/or event.

In a non-limiting example in the context of a flight training event, Pre-Event Preparation Information may include event data (e.g., that identifies an event date, a flight schedule, an airport, airspace information, a quantity of aircraft, identification of aircraft participating, identification of aircrew participating, identification of instructors overseeing, etc.), a pre-event briefing information (e.g., a type of flight profile or mission, platform subsystems to be employed, success criteria, etc.), aircrew biographical information (e.g., names, quantity of flight hours, types of experience, types of flight certifications, types of subsystem experience, etc.), platform maintenance information, etc.

Additionally, or alternatively, application server 130 may communicate with a fourth server device 110 to obtain System Characteristics associated with a platform to be used in the operation and/or event. The System Characteristics may include information that identifies the type of system used by the operator or other operators (e.g., model, type and/or series of an aircraft, rotorcraft, marine vessel, automobile, weapon system, threat system, computer system, industrial machine, etc.), performance characteristics (e.g., minimum, maximum, average, optimum, etc.) of the system (e.g., speed, acceleration, altitude, climb rate, range, engine performance, radar performance, bandwidth, data rate, waveform, signal strength, fuel consumption, horsepower, thrust, torque, temperature, pressure, deceleration, turn-rate, down force, etc.), etc. In the context of a sporting event, System Characteristics may also, or alternatively, identify an operator's personal performance characteristics (e.g., speed, strength, vertical jump, shooting percentage, scoring average, batting average, quantity of disqualifications, quantity of infractions, etc.) determined prior to the event or operation.

Application server 130 may use the proficiency application to communicate with a fifth server device 110 to obtain Environment Information associated with the environment in which the event and/or operation was or will be performed. Environment Information may include, for example, weather or climate conditions (e.g., temperature, humidity, due point, wind speed and direction, precipitation, etc.), environmental conditions (e.g., visibility, sea state, road or track conditions, traffic conditions, terrain, field conditions, available spectrum, etc.), and other environmental factors such as track layout, airspace, field type, etc. The Pre-Event Planning Information, System Characteristics and Environment Information may be obtained before, during or after an event.

As shown in FIG. 3, process 300 may include executing the event 320. For example, application server 130 may communicate with server device 110 and/or platform device 150 to monitor an operation and/or event and to obtain Event Execution Information associated with the event on a real-time or near-real time basis during the event, and/or after the operation and/or event has concluded. The Event Execution Information may identify, for example, time, space, position of a platform as a function of time during all or a portion of the operation. The Event Execution Information may also, or alternatively, identify decisions made and/or actions taken by the operator when performing the operation (e.g., timing of such actions and/or decisions, vehicle speed, acceleration/deceleration, flight path, direction, altitude, turn rate, vehicle input commands (such as throttle, stick, rudder, flap, aileron, steering wheel, braking, etc. position, movement and/or pressure), employment of subsystems (e.g., radars, sensors, weapons, etc.), communications with other participants, navigation decisions, weapon selection and deployment, etc. In the context of a sporting event and/or gaming event, Event Execution Information may include operator (i.e., player) shot selection, points scored, assists made, saves, turnovers, errors made, etc.). Event Execution Information may also, or alternatively, include information obtained from the vehicle, platform, system, simulator and/or subsystem (e.g., information displayed in the cockpit and/or obtained from avionics systems, speed sensors, navigation systems, electronic warfare systems, temperature sensors, pressure sensors, altimeters, etc.) during the operation and/or event.

Process 300 may further includes Event Processing 330, which may include comparing the Event Execution Information to Pre-Event Preparation Information, System Characteristics, Environment Information and/or information associated with another operation or event (which may be stored on, for example, storage 140). For example, application server 130 may execute the proficiency application to analyze in real time the Event Execution Information and compare it to the foregoing information.

Process 300 may include an Update Event process 340 in which the proficiency application determines that some characteristic of the process should be updated. For example, Update Process 340 may include generating the notifications described herein and providing the notifications to the operator. Additionally, or alternatively, Event Processing 330 may further include overriding, by the Application Server and/or the Operator Device, the inputs from the operator to control the vehicle, platform, system, simulator and/or subsystem. Additionally, or alternatively, Event Processing may further include automously controlling the vehicle, platform, system, simulator or subsystem (i.e. without operator input, in an autonomous vehicle, etc.). The Operator Device and/or Application Server may directly control (i.e. provide a signal directly to) the vehicle, platform, system, simulator and/or subsystem or may indirectly control (i.e. provide a signal to another device that controls or has the ability to control) same.

The Update Process 340 may include an artificial intelligence process implemented by the proficiency application. Artificial intelligence process may use the Event Execution Information, the Pre-Event Preparation Information, the Environment Information, the System Characteristics or a comparison thereof, to allow a prediction of future events based on this information. The proficiency application may predict the future event by, for example, providing a regression (e.g. linear regression, polynomial regression) model of this information to perform an assessment of, for example, how the operator will react in a situation, the likelihood that the reaction will cause a negative result, as well as many other indications of how the operator will perform the event. The proficiency application may use various artificial intelligence-based processes for carrying out the embodiments disclosed herein. For example, predictions may be based on a probability distribution based on data provided by operator device 130 or another device, such as a server device 110. The probability distribution may arise from a comparison of historical data (e.g. data reflecting performance of the operator, etc.) to information gathered from Event Execution 320 and/or Event Processing 330. Other data modeling techniques may also, or alternatively, be used to predict success, results, etc. In one example, the probability distribution may be used to predict the anticipated future conduct of an operator. In one example, the anticipated future conduct of the operator may not conform to a mission, event, operation, etc. A notification or instruction may be delivered to the operator to change operation during the event.

Update Event 340 may provide additional inputs to the operator. Additional inputs to the operator may increase the likelihood of a successful event, may prevent an operator from being harmed and/or may minimize financial risks (i.e. loss of a vehicle, life, etc.). For example, the artificial intelligence process may include overriding the inputs from the operator to control (or autonomously controlling) the vehicle, platform, system, simulator and/or subsystem. In another example, artificial intelligence process may include instructing the proficiency application to change the Pre-Event Planning Information to update a mission, flight plan, etc. to provide a greater likelihood of success based on a probability distribution. Proficiency application that enables real-time and/or near-real time communications with the operator during event execution. Application server 130 may receive Event Execution Information from platform device 150 (or operator device 120) and may compare one or more elements of the Event Execution Information (e.g., identifying a time, space, position, altitude, speed, direction, tactic, subsystem being employed, etc.) with corresponding prescribed elements identified in the Programming Information. If application server 130 determines that elements of the Event Execution Information are not approximately equal to the prescribed elements (e.g., within one or more deficiency thresholds), application server 130 may determine that a deficiency has occurred or is about to occur. Based on the determination that a deficiency has or is about to occur, application server 130 may generate a notification and/or instruction that identifies corrective action to be taken, by the operator, operator device 120, and/or platform device 150, to correct the deficiency. Additionally, or alternatively, based on the determination that a deficiency has or is about to occur, application server 130 may update the Pre-Event Planning Information to change some aspect of the operation (i.e. update a mission, event etc). A notification that the Pre-Event Planning Information has been changed may be provided to the operator.

Application server 130 may transmit the notification and/or instruction to the operator (e.g. via operator device 120, platform device 150, etc.). For example, platform device 150 or operator device 120 may receive the notification and may use the notification as a training aid for the operator by outputting a message to the operator (e.g., via a speaker, a display device, a user interface, etc.), as a warning of the deviation. The message may include an audible tone, an audible message, a vibration (with a particular frequency or cadence) that is sensed by the operator (e.g., in the seat, steering wheel, control stick, etc.). In another example, platform device 150 or operator device 120 may determine when the deviation has occurred or is about to occur and may determine when or whether to output the message to the operator. The message to the operator may include any number of messages intended to reduce harm to the operator, financial risk, etc. (i.e. reduce speed, change course, return to base, etc.).

Additionally, or alternatively, platform device 150 or operator device 120 may output a control signal, based on the notification and/or instruction, that prevents the operator from performing the deviation by overriding an input from the operator or by autonomously controlling. Such a control signal may cause platform control devices (e.g., throttle, flight controls, brakes, steering controls, etc.) to execute corrective measures to reduce the severity of the deviation and/or to eliminate the deviation regardless of an operator's input. Such overriding control may be implemented, by platform device 150, when the deviation constitutes a critical deviation associated with a risk to life, bodily harm, or loss of property.

As shown in FIG. 3, process 300 may include performing Post-Event Processing 350 to determine a level of proficiency of an operator associated with an operation. For example, application server 130 may execute the proficiency application to process the Environment Information and/or the Event Execution Information obtained in connection with the operation and/or event to generate Reconstruction Information that enables details of "what" occurred during the operation and/or event to be determined. Generating Reconstruction Information may include using artificial intelligence to determine what occurred. Additionally, or alternatively, these techniques may be used to Update Event 340. For example, the proficiency application may obtain Event Execution Data that identifies what occurred at specific points in time (i.e. along a timeline). Data modeling and/or regression techniques may be used to determine what occurred between the points in time along the timeline for which data exists. Additionally, or alternatively, historical data associated with the operator may be queried (i.e. from storage 140, server device 110, etc.) and compared, using the proficiency application, to the Event Execution Data. Similarities between the historical data and the Event Execution Information may be determined by the artificial intelligence and may be relied on to predict (i.e. using data smoothing, etc.) what occurred during certain points along the timeline to create the Reconstruction Information. Further, these artificial intelligence techniques may also, or alternatively, be used when comparing the Pre-Event Planning Information to the Event Execution Information. Data models may be generated from, for example, missions that are included in the Pre-Event Planning Information and compared to data models that are generated from Event Execution Information. Smoothing, regression and other techniques may be used, by the artificial intelligence, to compare the data models, and the proficiency application may "learn" based on the comparison. Additionally, or alternatively, these artificial intelligence techniques may be used when the Pre-Event Planning Information includes historical information of the operator, in which case the artificial intelligence may be used to determine that an event or operation (mission, plan, etc.) will not be successful. These comparisons may be used to in Update Event 340 to change an operation as described herein.

Reconstruction Information may, in a nonlimiting example, identify a timeline associated with the operation and/or event that identifies and/or records the occurrence of one or more activities, tasks, and/or decisions made by the operator, another operator, and/or a system (e.g., a change in direction, acceleration, deceleration, shot attempt, score, weapon deployment, etc.) during the operation and/or event as a function of time (e.g., beginning before, during or after the beginning of the operation and ending before, at, or after the conclusion of the operation). The Reconstruction Information may also, or alternatively, identify one or more outcomes of the operation as a result of some or all of the activities or environmental factors that occurred during the operation and/or event.

Post-Event Processing 350 may further include analyzing the Reconstruction Information. For example, application server 130 may use the proficiency application to analyze the Reconstruction Information in the context of the Pre-Event Preparation Information, and/or System Characteristics to generate operations analysis information that identifies the details of "how" the operation and/or event was performed (hereinafter, referred to as "Operations Analysis Information"). The Operations Analysis Information may, for example, include information that identifies the manner in which the actual operation conformed to the planned operation (i.e. the degree to which the Pre-Event Planning Information does not match the Event Execution Information at a point in time) and/or the manner or degree to which the actual operation deviated from the planned operation as described in the Pre-Event Preparation Information. For example, application server 130 may compare one or more elements of the Reconstruction Information to one or more corresponding elements of the Pre-Event Preparation Information to identify any similarities and/or differences in the manner in which the operation was actually performed (based on the Reconstruction Information) relative to the manner in which the operation was required to be performed (based on pre-determined Pre-Event Preparation Information). Additionally, or alternatively, application server 130 may compare one or more elements of the Reconstruction Information to the Pre-Event Preparation Information and one or more corresponding elements of System Characteristics to determine that the differences in the manner in which the operation was actually performed were due to a characteristic of the vehicle (i.e. a malfunction, etc.). Additionally, or alternatively, application server 130 may compare one or more elements of the Reconstruction Information to the Pre-Event Preparation Information and one or more corresponding elements of Environment Information to determine that the differences in the manner in which the operation was actually performed were due to environmental conditions (i.e. a storm, wind, etc.).

By way of a non-limiting example, in the context of a flight training mission, application server 130 may analyze one or more elements of the Reconstruction Information to identify how an operator performed a particular mission (e.g., in terms of time, speed, altitude, flight path, maneuvers, tactics employed, employment of radar and/or other subsystems, use of weapons, communications, etc.) and may compare such elements to corresponding elements set forth in pre-determined flight plan, tactics, rules of engagement, policies and procedures, training syllabi, historical information about the operator, etc. as described in the Pre-Event Preparation Information. Based on the comparison, application server 130 may identify whether the actual operation was performed in accordance with the planned operation. A deviation may be identified when an operator failed to perform a prescribed action and/or activity (e.g., a maneuver, a tactic, a communication, employing a subsystem, etc.) and/or performed an action or activity that was not prescribed in the Pre-Event Planning Information. A deviation may also, or alternatively, be identified when an operator performed a prescribed action or activity, but performed such action or activity incorrectly (e.g., at an incorrect time, altitude, speed, location, direction, turn rate, etc.). A deviation may also, or alternatively, be identified when an operator performed a prescribed action or activity differently from the way the same action or activity was performed in the past, as indicated by the historical data of the operator. Application server 130 may identify each deviation and may include information identifying each deviation as part of the Operations Analysis Information.

Post-Event Processing 350 may further include assessing the Operations Analysis Information. For example, application server 130 may execute the proficiency application to perform an assessment of the Operations Analysis Information to generate proficiency information that identifies one or more causes of "why" the performance of an actual operation deviated from the planned operation (hereinafter, collectively referred to as "Proficiency Information"). For example, application server 130 may obtain, from the Pre-Event Preparation Information, information that identifies one or more prescribed metrics, assessment points, and/or success criteria associated with all or a portion of the operation. The one or more metrics, assessment points, and/or success criteria may be used, by application server 130, to evaluate the proficiency in which an operator executed an operation based on, for example, the operators proficiency in operating the vehicle and/or the operator's adherence to one or more tactics, training syllabi, policies, procedures, mission plans, etc. associated with the operation. Additionally, or alternatively, the one or more metrics assessment points and/or success criteria may be used to modify and/or update the one or more tactics, training syllabi, policies, procedures, mission plans, etc., associated with the operation. Application server 130 may also, or alternatively, identify the actual outcome of the operation and compare it to the planned outcome (e.g., based prescribed success criteria) to determine whether the outcome of the operation was successful, partially successful or not successful.

For each deviation, application server 130 may also, or alternatively, determine whether the deviation was caused by an environmental factor identified by the Environment Information (e.g., weather, poor visibility, incursions into the airspace, safety of flight, etc.), a system limitation identified by the Systems Characteristics (e.g., system or subsystem malfunctions, maintenance issues, etc.), and/or some other cause (e.g., Instructor terminates training, incursion into airspace, and/or other events beyond the operator's control). In the event that the deviation was caused by the environment or by some characteristic of the system, the level of proficiency may be updated, changed, discarded, etc.

For each deviation that is within the control of the operator, application server 130 may identify a quantity of deviations, a level of severity of each deviation (e.g., based on an amount to which each deviation is greater than or less than a prescribed metric and/or threshold), and/or a level of criticality of each deviation (e.g., based on a likelihood that a deviation increases the risk of injury, loss of life, or substantial loss of property, etc.). In one example, application server 130 may identify characteristics associated with each deviation (e.g., actual and/or percent difference between an actual and prescribed time, distance, direction, altitude, subsystem deployment, etc. for each deviation) and may assign a level of severity to the deviation based on whether an actual difference or percent difference is greater than a severity threshold (e.g., greater than 10%, 20%, 30%, etc.). In another example, application server 130 may identify a level of criticality of a deviation based on the occurrence of some event (e.g., altitude is less than a prescribed altitude, distance between platforms is less than a prescribed distance by more than a criticality threshold, failure to follow safety procedures and protocols, etc.).

Based on the quantity, level of severity and/or level of criticality of each deviation attributable to the operator, application server 130 may identify a level of proficiency associated with the operators. The level of proficiency may identify a relative strength and/or weakness that the operator exhibits in connection with certain prescribed criteria or assessment points (e.g., proficiency in platform control, timing, adherence to prescribed tactics and plans, ability to follow and/or execute policies or procedures, etc.) associated with the operation and/or event. The level of proficiency could be used to provide identify an operator that ready for advancement and/or requires additional training to reduce the quantity, level of severity and/or level of criticality of deviations.

Additionally, or alternatively, Post-Event Processing 350 may include determining a proficiency score associated with the operator based on the quantity, level of severity and/or level of criticality of each deviation relative to the total quantity of prescribed metrics or assessment points prescribed for the operation. Additionally, or alternatively, application server 130 may evaluate the proficiency of the operator based on one or more scores relative to a training curriculum, policy, mission plan, etc. associated with the operation.

Post-Event Processing 350 may further include developing an integrated debrief and/or memorializing the operation. For example, application server 130 may store, in storage 140 and/or a memory associated with application server 130, some or all of the information collected and/or generated prior to the event, during execution of the event, and/or after the conclusion of the event including, for example, the Pre-Event Preparation Information, System Characteristics, Environmental Information, Event Execution Information, Reconstruction Information, Operation Analysis Information, and/or Proficiency Information. Application server 130 may also, or alternatively, generate a report that includes some or all of the information identified in the previous sentence and may transmit the report to one or more server devices 110 to inform the relevant governing agency and/or organization to the results and/or outcomes of the operation. Application server 130 may also, or alternatively, present the above identified information for display via a user interface (e.g., such as User Interface 400 illustrated in FIG. 4) being displayed on a display device associated with application server 130 and/or operator device 120. The above identified information may be presented in a integrated debrief, which may provide details the event, include what happened at specific points in time during the event. The integrated debrief may include markers that indicate when something happened during the event. Proficiency application may execute instructions to compare what happened at the time associated with a marker to what was scheduled to occur at that time.

Process 300 may further include suggesting Remedial Measures 360 for the operator. If, for example, a score is greater than a threshold for a metric or assessment point (e.g., the operator's ability to adhere to a prescribed tactic), application server 130 may output a first notification indicating that the operator is permitted to advance in the curriculum to train for and/or perform other tactics in a manner described above. However, if the score is not greater than the threshold (e.g., the operator deviated from and/or was not able to demonstrate the ability to adhere to the prescribed tactic), application server 130 may output a second notification indicating that the operator is required to review tactics manuals and/or perform the operation again (e.g., in a live vehicle, simulator, practice environment, etc.) to demonstrate proficiency regarding the prescribed tactics. Further, if the score is not greater than the threshold, application server 130 may suggest remedial measures to bring the operator to the threshold. Such remedial measures may include, for example, additional training, additional testing, etc., which may increase the proficiency of the operator. The proficiency application may compare the score to historical data (i.e. data for the same operator, other operators, etc.) to determine a type and/or quantity of remedial measures. The proficiency application may use an artificial intelligence process to determine the quantity of remedial measures needed based on increases in performance by the operator after the receipt of previous remedial measures, increases by other operators based on the suggested training, etc.

Application server 130 may evaluate the proficiency of the operator based on one more different scores, associated with other metrics (e.g., execution of policies and/or procedures, adherence to training syllabi, mission plans, mission plans, rules of engagement, etc.) pertinent to the operation. Based on whether or not the different scores are greater than respective thresholds associated with the other metrics, application server 130 may output one or more notifications indicating whether or not the operator is permitted to advance in the curriculum or is required to review prescribed materials and/or perform the operation again to demonstrate increase proficiency.

As shown in FIG. 3, process 300 may include Developing Improvements 370 that can be used to update Pre-Event Planning Information (e.g., policies, tactics, flight plans, game plans, rule books, rules of engagement, procedures, etc.) for future operations or events, such as to increase the likelihood of success of a future operation or event. For example, application server 300 may execute a proficiency application that uses artificial intelligence and/or machine learning logic to modify and/or improve the Pre-Event Preparation Information and/or aid an operator and/or platform being operated by the operator during event execution and/or a future operation. For example, application server 130 may determine that the respective outcomes of one or more operations are not affected even when a metric (e.g., associated with speed, altitude, range, a particular tactic, maneuver, weapon employment, etc.), associated with the operation, varies widely (e.g., greater than a threshold). Based on such a determination, application server 130 may determine that a mission plan, tactic, training curriculum, policy, procedure etc., associated with the Pre-Event Preparation Information, should be modified to decrease the importance or emphasis that is placed on such a metric. In this example, application server 130 may output a notification to one or more server devices 110, from which information associated with the tactics, training curriculum, policy, procedure, etc. is obtained, indicating that the mission plan, tactic, training curriculum, policy, procedure etc. should be modified to decrease the importance or emphasis that is placed on such metric. However, in a different example, application server 130 may determine that respective outcomes of one or more operations are significantly and/or unexpectedly affected even when a different metric, associated with the operation, varies only slightly (e.g., not greater than some other threshold). Based on such a determination, application server 130 may determine that a mission plan, tactic, training curriculum, policy, procedure etc. should be modified to increase the importance or emphasis that is placed on the different metric. In this example, application server 130 may output a notification to one or more other server devices 110, from which information associated with the tactics, training curriculum, policy, procedure, etc. is obtained, recommending that the mission plan, tactics, training curriculum, policy, procedure etc. should be modified to increase the importance or emphasis that is placed on the different metric. In another example, Developing Improvements 370 includes modifying the Pre-Event Planning Information based on the proficiency of an operator (i.e. the operator is not proficient enough for certain details of a mission) and/or based on the Reconstruction Information (i.e. how a previous operation occurred demonstrates that an operator may not be able to perform certain aspects of a mission).

Figure 4:
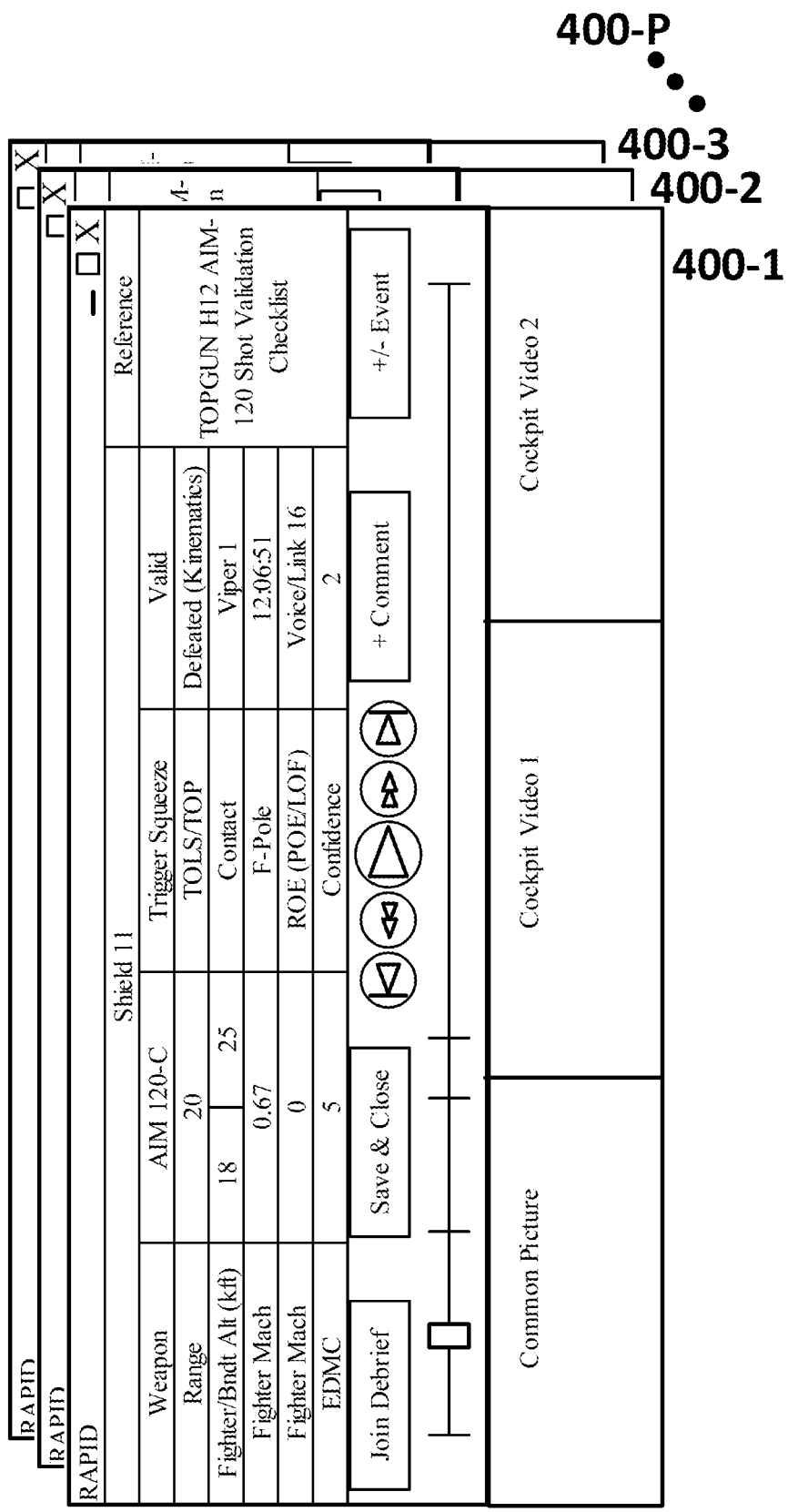
FIG. 4 is a diagram of a user interface via which information associated with an operation or event may be displayed.

As shown in FIG. 4, user interface 400 (which is shown in FIG. 4 as a group of user interfaces 400-1, 400-2, 400-3, . . . , 400-P (where P≥1) (hereafter referred to collectively as "user interfaces 400" and each, a "user interface 400") may provide content to operators and/or others associated with the systems and/or methods described herein. Example user interface 400 (e.g., labeled "Proficiency Application") may include one or more fields associated with the operation including a platform configuration field, a reference field (e.g., that identifies a reference source associated with the platform configuration), common picture field (e.g., to display video of the operation and/or one or more participating platforms); one or more first video fields (shown as "Video 1") that can playback instrumentation of a platform being operated by the operator during the operation; and/or one or more second video fields (shown as "Video 2") to enable playback of instrumentation of the platform or some other participating platform. User interface 400 may also, or alternatively, include other fields that permit video fields to be played, rewound, fast-forwarded, etc.; a timeline of the operation and identifies when a key activity occurred (shown as a black vertical slash mark) and/or when a deviation occurred (shown by vertical red slash mark), which enables the common video, first video and/or second video fields to play back content at a time that corresponds to the activity and/or deviation. User interface 400 may also, or alternatively, include a field (e.g., a button, switch, etc.) that, when selected, enables another operator device 120 to participate in and/or display user interface 400 on a display associated with the other operator device 102. User interface 400 may include another field (e.g., buttons, switches, etc.) that, when selected, allows an operator to select a different operation and/or event to play back. While example fields associated with user interface 400 are described herein, user interface 400 may convey information associated with any content (e.g. Pre-Event Preparation Information, Environmental Information, etc.), and the content of the fields (and number of fields) associated with user interface 400 is not limited to the content described herein.

User interface 400 may convey (e.g. provide a display, a noise, a vibration, etc.) the information associated with the fields to the operator. For example, one or more of the fields of user interface 400 may provide the notifications described herein to the operator. Additionally, or alternatively, user interface 400 may convey information to persons other than the operator. For example, the content of user interface 400 (and all information associated with the fields of user interface 400) may be provided, such as via network 160, to operator device 120, platform device 150, application server 130 and/or another device or subsystem to provide the content to others associated with the event or operation. In one example, the content of user interface 400 is provided to operator device 120 and/or platform device, which provides the content to application server 130. The content of user interface 400 may be provided to other devices (e.g. server device 110) which may receive the content of the user interfaces 400 of one or more operators (e.g. user interface 400-1 of a first operator, user interface 400-2 of a second operator, etc.) to, for example, enhance coordination of an event and/or operation, understand the Environmental Information of the operators, etc.

Figure 5:
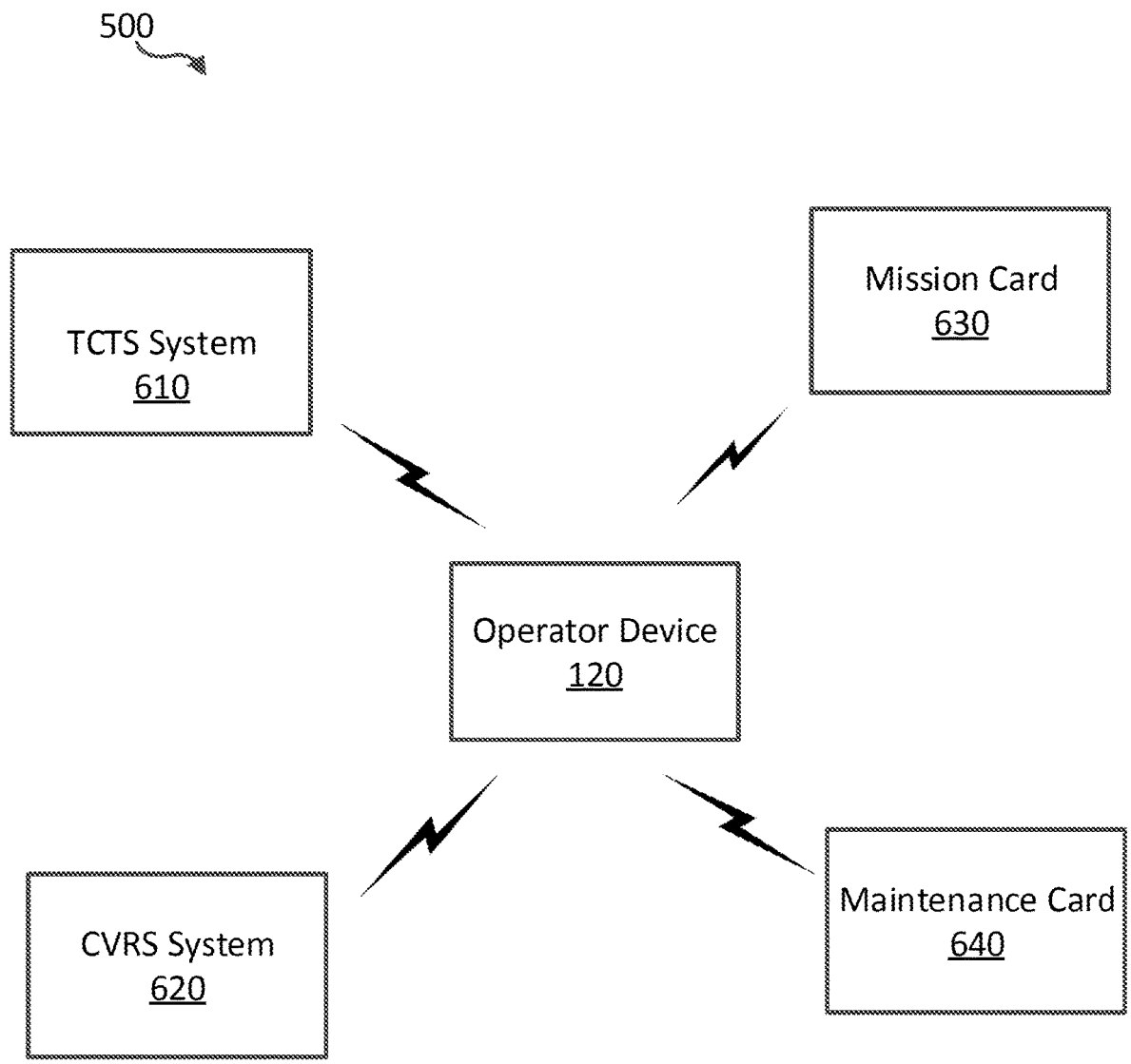
FIG. 5 depicts an example environment in which an operator device, executing the proficiency application, may obtain Event Execution Information.

FIG. 5 depicts an example environment in which an operator device, executing the proficiency application, may obtain Event Execution Information. As shown in FIG. 5, environment 500 may include an operator device 120 that communicates with a TCTS System 610, a CVRS System 620, a Mission Card 630 and a Maintenance Card 640. The number of devices, systems and cards are provided for explanatory purposes only. In practice, there may be additional devices, cards and/or systems, fewer devices, cards and/or systems, or different devices, cards and/or systems than what is illustrated in FIG. 5. Additionally, or alternatively, substitute devices, cards, or systems may replace what is shown in FIG. 5. For instance, sensors may replace one or more of the systems reflected in FIG. 5. FIG. 5 is an example environment that reflects the implementation of the systems and/or methods in an aircraft. However, as described herein, the systems and methods may be implemented in a wide variety of environments in many different configurations.

Operator Device 120 may correspond to a device associated with an operator (a pilot in this example) who is executing an event. Operator device may communicate (such as via Network 160) with TCTS System 610, CVRS System 620, Mission Card 630 and Maintenance Card 640 to obtain Event Execution Data. TCTS System 610 may correspond to a tactical combat training system which provides real time data reflecting the time, space, position and heading of the aircraft. TCTS System 610 is an example system that is used to capture this information, and many other known systems may be substituted, or used in addition to, TCTS System 610 to provide this information. TCTS System 610 is merely an example time space position system that provides this information about an aircraft.

CVRS System 620 may be a cockpit video recording system that captures (e.g. via video recording, audio-video recording, flight data recording, etc.) what an aircrew and/or aircraft is doing during an event. CVRS System 620 may be linked or integrated with TCTS System 610 to determine, for instance, the timing of a recorded event, the position of the aircraft during a recorded event, etc. While CVRS is used in this example, any cockpit recording system may provide this information and/or additional information.

Mission Card 630 may correspond to a memory device (such as Storage 140) that records details of an aircraft mission or event. For instance, mission card 630 may record when a weapon was fired, the altitude of the airplane at a specific time, bearing, range, information associated with a target, etc.

As discussed above, user device 120 may communicate with TCTS System 610, CVRS System 620, Mission Card 630 and Maintenance Card 640 to provide the Event Execution Information described herein. Additionally, or alternatively, another device reflected in FIG. 1 may communicate (via network 160) with TCTS System 610, CVRS System 620, Mission Card 630 and Maintenance Card 640 to obtain the Event Execution Information, which may be processed as described herein.

Figure 6:
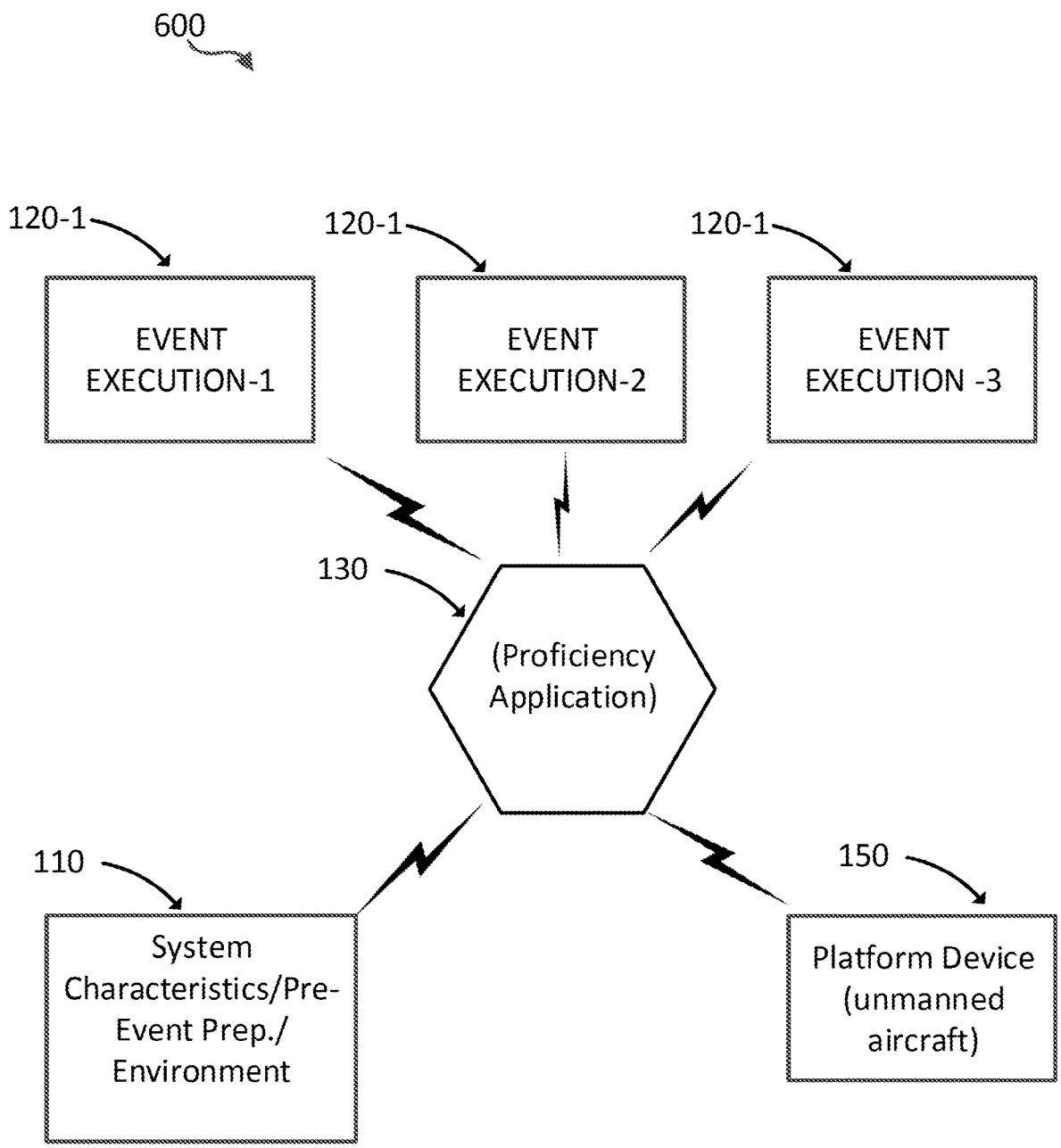
FIG. 6 illustrates an example environment in which the systems and/or methods, described herein, may be implemented.

FIG. 6 illustrates an example environment in which the systems and/or methods, described herein, may be implemented. Environment 600 may include a first operator device 12-1, a second operator device 120-2, a third operator device 120-3, an application server 130, a server device 110 and a platform device 150. The number of devices and/or servers are provided for explanatory purposes only. In practice, there may be additional devices, servers and/or systems, fewer devices, servers and/or systems, different devices, servers and/or systems or differently arranged devices, servers and/or systems than what is illustrated in FIG. 6. FIG. 6 is an example environment that reflects the implementation of the systems and/or methods in an aircraft mission. However, as described herein, the systems and methods may be implemented in a wide variety of environments in many different configurations.

In this example embodiment, environment 600 corresponds to an aircraft mission. Application server 130 may communicate (e.g. via network 160) with the other devices/servers herein to obtain the information described herein. Application server may execute the proficiency application to process the information as described herein. Additionally, or alternatively, the proficiency application may be stored, in whole or in part, on other of the devices and/or servers described herein.

A first aircraft is associated with first operator device 120-1, a second aircraft is associated with second operator device 120-2 and a third aircraft is associated with third operator device 120-3. Platform device 150 may be associated with, for instance, an unmanned aircraft that scans an area (e.g. a combat area, etc.) to detect, for example, other aircraft, potential targets, potential threats, etc. Server device 110 may be a device associated with a mission that communicates, for instance, Pre-Event Preparation Information (including, for example, mission planning, etc.), System Characteristics and/or Environmental Information to application server 130. This information may be used in connection with the systems and/or methods described herein.

Environment 600 may include a mission in which first aircraft, second aircraft and third aircraft seek to accomplish one or more tasks. Unmanned aircraft, associated with platform device 150, may also be part of the mission. When the mission is executed, first operator device 120-1 communicates with application server 130 to provide Event Execution Information for the first aircraft. Similarly, second operator device 120-2 and third operator device 120-3 communicate with application server 130 to provide Event Execution Information for second aircraft and third aircraft, respectively, while the mission is being executed. Platform device 150 may provide Event Execution Information for the unmanned aircraft, which may include providing real-time details on potential threats to the mission. For instance, Platform device 150 may identify hostile aircraft, anti-aircraft artillery, etc., and may communicate with application server 130 to provide this Event Execution Information to the proficiency application. Proficiency application may compare the Event Execution Information from platform device 150 to, for instance, the System Characteristics for first aircraft to update the mission. For example, proficiency application may determine that second aircraft should alter its mission to avoid a risk rising from the hostile aircraft identified by platform device 150. This may include sending a notice to first operator device to notify first aircraft to eliminate the hostile aircraft. Additionally, or alternatively, this may include requiring second aircraft to change its altitude, deploy countermeasures, etc. This may also, or alternatively, include requiring first aircraft and third aircraft to go ahead of second aircraft to eliminate the threat associated with the hostile aircraft. Application server 130 may execute the proficiency application to predict an outcome of the mission. The proficiency application may compare, for example, Event Execution Information from the aircraft with Pre-Event Preparation Information, System Characteristics and/or Environment Information to determine whether a mission is likely to succeed. After the mission, the Event Execution Information may be compared with the Pre-Event Information and/or updated information to determine the proficiency of an operator.

Figures 7A, 7B:
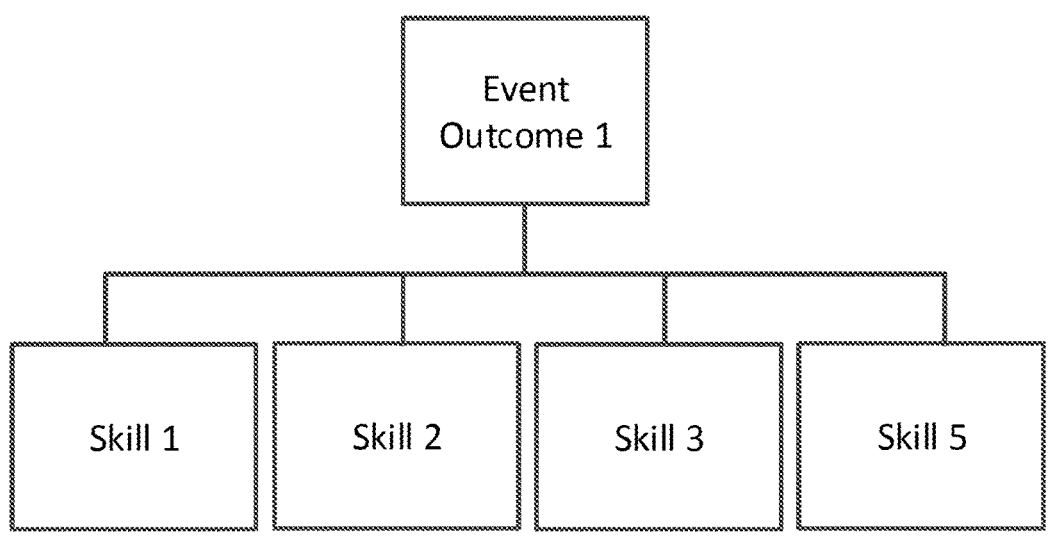
FIGS. 7A & 7B illustrate an example implementation of the artificial intelligence system disclosed herein.

FIGS. 7A and 7B illustrate an example implementation of the artificial intelligence system logic described herein. As shown in FIG. 7A, database 701 includes organized information associated with an event. The information may include the identification of an operator, event outcomes (i.e. that can be analyzed to determine if they conform with Pre-Event Preparation Information) and skills. Skills may be derived from on historical information of an operator (i.e. ability to conform with Pre-Event Preparation Information, etc.), may be data that is input directly (i.e. input into a device 200, storage 140), etc. Database 701 may organize the skill data in a way that aligns operator performance such that a correlation between skills and outcome may be obtained. Using artificial intelligence techniques (e.g. regression, multiple classification, linear discriminant analysis (LDAs), binary classification, predictive decision support, clustering, anomaly detection, decision trees, federate learning, K-Nearest neighbors, learning vector quantization, support vector machines, Bayesian networks, Naïve Bayes classifiers, and genetic/evolutionary algorithms) the information in database may be used to predict event outcomes, such as Event Outcome 1 and Event Outcome 2. The artificial intelligence system may compare (using artificial intelligence techniques) Event Outcome 1 to previous event outcomes to determine the similarity between Event Outcome 1 and the previous outcomes. As a result of these comparisons, the artificial intelligence system may determine that certain skills have a weak correlation to an event outcome while other skills have a stronger correlation a to event outcomes. In this example implementation, skills that do not have a correlation to outcomes may then be excluded from future artificial intelligence techniques used to predict Event Outcome 1, as reflected in chart 702.

Chart 702 reflects that skill 1, skill 2, skill 3 and skill 5 have a statistically significant correlation to event outcome 1. For example, an operator's maneuverability, reflex time, training scores in a field and experience may determine whether the operator will likely be able to successfully complete event 1. To predict whether the operator is likely to be successful, a linear regression analysis may be used in which each of the skills may be multiplied by a coefficient (i.e. a number based on the importance of the skill as determined by the artificial intelligence system) that reflects the correlation between the skill and the outcome. The results may then by tallied and may be added to a constant (if necessary) to obtain a figure that can be used to determine the likelihood that Event Outcome 1 will occur. In some embodiments, the coefficients may be assigned so that the figure can be no more than 1 (i.e. indicating 100% likelihood), and the smaller the figure the lower the likelihood that Event Outcome 1 will occur. The techniques, skills, outcomes, operators, databases and charts illustrated in FIGS. 7A and 7B are provided for explanatory purposes only. In practice, there may be many additional/fewer data that are analyzed, different techniques used, and different outcomes predicted that reflects in FIGS. 7A and 7B.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIG. 3, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms comprises and comprising, when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for optimizing the proficiency of an operator of a vehicle undertaking an event in the vehicle, the method comprising:
    obtaining, by an application server, pre-event preparation information, the pre-event preparation information comprising a first detail that provides information about the event,
    obtaining, by the application server, event execution information, the event execution information identifying a second detail, the second detail describing how the event is being undertaken by the operator,
    analyzing, by the application server, the event execution information to generate reconstruction information, the reconstruction information including a timeline of one or more activities that occurred during the event, including the second detail,
    comparing, by the application server, the reconstruction information to the pre-event preparation information to determine a deviation between the first detail and the second detail,
    determining, by the application server a level of proficiency of the operator based on the deviation, the level of proficiency identifying a strength or a weakness of the operator,
    whereby the application server executes a proficiency application to perform the method, the proficiency application utilizing artificial intelligence to generate the reconstruction information.

2. The method of claim 1, further comprising obtaining by the application server environment information that describes the environment in which the event occurred and comparing by the application server the environment information to the reconstruction information to determine whether the deviation was based, in whole or in part, on the environment.

3. The method of claim 2 further comprising updating the level of proficiency of the operator when the application server determines that the deviation was based, in whole or in part, on the environment.

4. The method of claim 1 further comprising obtaining by the application server system characteristics that identify a characteristic of a vehicle used by the operator during the event and comparing by the application server the system characteristics to the reconstruction information to determine whether the deviation was based, in whole or in part, on the system characteristics.

5. The method of claim 4 further comprising updating the level of proficiency of the operator when the application server determines that the deviation was based, in whole or in part, on a characteristic of the vehicle.

6. The method of claim 1 further comprising identifying by the application server remedial measures for the operator, the remedial measures intended to increase the proficiency of the operator.

7. The method of claim 1 further comprising developing improvements that update the pre-event preparation information based on the level of proficiency or the reconstruction information, the improvements increasing the likelihood of success of a future event.

8. The method of claim 1 further comprising creating by the application server a debrief report that includes the reconstruction information and the level of proficiency of the operator.

9. The method of claim 1, where the pre-event preparation information is obtained by the application before the event occurs.

10. The method of claim 1, where the pre-event preparation information is obtained by the application server during or after the event.

11. An artificial intelligence system for providing real-time instructions to an operator of a vehicle, or for controlling the vehicle, while the operating is executing an event with the vehicle, the artificial intelligence system comprising:
    an application server in communication with an operator device, associated with the vehicle, the application server executing instructions provide real time instructions to the operator while executing the event, at least one storage device that includes system characteristics, the system characteristics identifying a characteristic of the vehicle, and pre-event preparation information, the pre-event preparation information identifying a detail of the event, the application server executing instructions to
receive, from the at least one storage device or the operator device, pre-event planning information that describes how the event should occur,
receive, from the operator device, event execution information that describes how the event is actually occurring,
compare the pre-event planning information to the event execution information using artificial intelligence to determine that the event is not being executed to match the pre-event planning information, the artificial intelligence including data modeling or regression techniques to predict the anticipated future conduct of the operator,
communicate with either the operator to provide an instruction to change how the vehicle is operated or with the operator device to provide an instruction that is executed by the vehicle that either overrides the operator's controls to determine how the vehicle is controlled or autonomously controls the vehicle, the instruction based on the anticipated future conduct of the operator.

12. The artificial intelligence system of claim 11 where the vehicle corresponds to an aircraft and the event execution information is obtained from at least one of a time-position-space system, a mission card, a cockpit recorder system or a maintenance card.

13. The artificial intelligence system of claim 11 where the instruction is provided to the operator visually via a display device of the vehicle, auditory via a speaker of the vehicle, or mechanically by a vibration device that imparts a vibration to the operator.

14. The artificial intelligence system of claim 11 where the instruction provided to the operator device overrides an operator control input or provides autonomous control input.

15. The artificial intelligence system of claim 14 where the operator control input corresponds to a steering wheel, control stick, foot pedal, button, brakes, flaps, or rudder.

16. The artificial intelligence system of claim 11 where the application server further executes instructions to
receive, from the at least one storage device or the operator device, environment information that describes the environment in which the event is occurring,
include the environment information in the comparison of the pre-event planning information and the event execution information to determine that the event is not being executed to match the pre-event planning information.

17. The artificial intelligence system of claim 11 where the application server further executes instructions to
receive, from the at least one storage device or the operator device, system characteristics that identify a characteristic of the vehicle,
include the system characteristics in the comparison of the pre-event planning information and the event execution information to determine that the event will is not being executed to match the pre-event planning information.

18. The artificial intelligence system of claim 11 where the storage device is integrated into a server device.

19. A non-transitory computer readable medium storing instructions that, when executed by a processor, cause the processor to utilize artificial intelligence to update a mission for an aircraft flown by a pilot, the instructions comprising:
receiving, from at least one storage device, pre-event preparation information that identifies a mission for the aircraft and includes historical information about the pilot,
receiving, from an operator device, event execution information that describes how the aircraft is being flown,
comparing the pre-event preparation information to the event execution information and the historical information about the pilot using artificial intelligence to determine a deviation from the mission, the artificial intelligence using the historical information about the pilot to determine that the mission will likely not be successful; and
updating the mission for the aircraft based on the deviation to increase the likelihood that the mission will be successful, that the pilot will not be harmed or that the risk of financial loss will be minimized.

20. The non-transitory computer readable medium of claim 19 where the instructions further comprise:
receiving, from the at least on storage device, system characteristics that identify a characteristic of the aircraft, and
including the system characteristics in the comparison of the pre-event preparation information to the event execution information and the historical information about the pilot to determine the deviation from the mission.

21. The non-transitory computer readable medium of claim 19 where updating the mission includes providing a notification to the pilot that instructs the pilot to return to base.

22. The non-transitory computer readable medium of claim 19 where the artificial intelligence includes analyzing the historical data about the pilot using regression techniques, or other data analysis techniques, to determine the anticipated future conduct of the pilot and comparing the anticipated future conduct of the pilot to the mission to determine that the mission will likely not be successful.

23. The non-transitory computer readable medium of claim 19 where the mission includes flight path information, and the event execution information includes the time, space, position and heading information for the aircraft.

24. The non-transitory computer readable medium of claim 19 where the storage device is integrated into a server device.

* * * * *